(12) United States Patent
Kozisek

(10) Patent No.: US 9,215,086 B2
(45) Date of Patent: Dec. 15, 2015

(54) SYSTEM AND METHOD FOR AN INTEGRATED DSL/CABLE MODEM PERFORMANCE TEST

(75) Inventor: Steven E. Kozisek, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1529 days.

(21) Appl. No.: 11/980,109

(22) Filed: Oct. 30, 2007

(65) Prior Publication Data

US 2009/0113045 A1  Apr. 30, 2009

(51) Int. Cl.
 *H04L 12/26* (2006.01)

(52) U.S. Cl.
 CPC ............ *H04L 12/2697* (2013.01); *H04L 43/50* (2013.01)

(58) Field of Classification Search
 CPC .............................. H04L 12/2697; H04L 43/50
 USPC ........................................................ 709/224
 See application file for complete search history.

(56) References Cited

U.S. PATENT DOCUMENTS

| | | | | |
|---|---|---|---|---|
| 4,646,320 A | * | 2/1987 | Krishnan | 375/222 |
| 4,956,852 A | * | 9/1990 | Hodge | 375/222 |
| 5,182,762 A | * | 1/1993 | Shirai et al. | 375/222 |
| 6,041,176 A | * | 3/2000 | Shiell | 703/27 |
| 6,996,132 B1 | * | 2/2006 | Tolety | 370/517 |
| 7,574,494 B1 | * | 8/2009 | Mayernick et al. | 709/222 |
| 2002/0054631 A1 | * | 5/2002 | Kim | 375/222 |
| 2002/0085501 A1 | * | 7/2002 | Guven et al. | 370/252 |
| 2002/0194310 A1 | * | 12/2002 | Chu et al. | 709/219 |
| 2005/0025189 A1 | * | 2/2005 | Smith | 370/503 |
| 2005/0068893 A1 | * | 3/2005 | Roberts et al. | 370/234 |
| 2005/0097217 A1 | * | 5/2005 | Val et al. | 709/233 |
| 2006/0031407 A1 | * | 2/2006 | Dispensa et al. | 709/219 |
| 2008/0101378 A1 | * | 5/2008 | Krueger | 370/395.52 |

OTHER PUBLICATIONS

Harris et al. Jun. 12, 2002. "Performance Analysis of the Linux Firewall in a Host". Cal. Polytechnic State University.*

* cited by examiner

*Primary Examiner* — Khaled Kassim
*Assistant Examiner* — Saad A Waqas
(74) *Attorney, Agent, or Firm* — Swanson & Bratschun, L.L.C.

(57) ABSTRACT

A modem, method, and system is presented for performing a data communications speed test or line speed test between a network node and a customer premises. The modem may be configured to perform calculations for determining the data communications speed without interference of network elements or overhead modules that cause data communications to be inaccurate or otherwise affected.

15 Claims, 5 Drawing Sheets

SYSTEM AND METHOD FOR AN INTEGRATED DSL/CABLE MODEM PERFORMANCE TEST

BACKGROUND OF THE INVENTION

Part of the widespread acceptance of the Internet has been due to a rapid increase in access speeds. Initially, dial-up access was the only available option to access the Internet for all but the most sophisticated users. Dial-up access required a traditional modem connecting to the Internet over a conventional land-based telephone line. While businesses have had other options for years involving expensive high speed Ethernet connections (e.g. T1 or T3 lines), a major advance came considerably more recently when Digital Subscriber Lines (DSL) and Cable modems became available for residential and business users and applications.

The demand for faster connections has coincided with increased use of the Internet. Bandwidth is the amount of data that can be carried from one point to another in a given time period. To satisfy new uses and applications of the Internet, bandwidth requirements continue to grow, with no foreseeable decline in sight. Accordingly, it is common for an Internet Service Provider (ISP) to offer several levels of service to their customers with various prices, with a difference in price for different level levels of service being based on the level of data throughput (also called line speed) that the connection is capable of delivering.

Currently, one way to determine data throughput, is to run data throughput tests that are readily available on the Internet. These tests are typically run from software installed on the customer's computer, usually downloaded as a Java® Applet. The software may initiate a file transfer, using File Transfer Protocol (FTP) or some other method, to determine the amount of time a file of a set size takes to transfer over the connection. Calculations are made by the software using this information to determine a data throughput for the connection.

Inaccuracies and bandwidth limitations may result from the above-described method for testing data throughput connections. Common factors that may result in inaccurate measurements include: wired cabling quality, type of wired home networking equipment used, type of wireless networking protocol between the computer and the modem, wireless network interference, computer performance (i.e. processing power, memory size, type of network card), firewall filtering, and traffic from other elements on the network. Furthermore, as understood by ISPs, service agreements are limited to line speed to the customer premises (i.e., the modem of the customer) and not to a computer within the customer premises.

SUMMARY OF THE INVENTION

To properly measure line rate and to overcome inaccuracies and bandwidth limitations at customer premises, Customer Premises Equipment (CPE) (e.g., a DSL or cable modem) may be enhanced to include an integrated speed testing function and reporting capability. This enhancement to the CPE allows the actual data throughput or line speed to the customer premises to be determined more accurately and without the factors that currently distort the line speed measurement or take the line speed measurement at an improper test point.

One embodiment of a method for testing data communications speed being delivered between a network node and a customer premise may be performed by initiating a data communications speed test to determine speed of data being communicated between a modem at a customer premise and a network node, causing test data to be downloaded from the network node, measuring speed, by the modem, of the test data being downloaded to the modem, and displaying the measured speed of the downloaded test data.

One embodiment of a modem configured to perform line speed tests may include an input/output unit configured to communicate communications signals over a communications network A processing unit may be in communication with the input/output unit, and be configured to initiate a data communications speed test in response to receiving a data communications speed request, measure communications speed of test data being received via the input/output unit, and report the measured communications speed.

BRIEF DESCRIPTION OF THE DRAWINGS

The principles of the present invention is described in detail below with reference to the attached figures, wherein.

DETAILED DESCRIPTION OF THE INVENTION

The principles of the present invention provide for a modem and method for testing, at the modem, data communications speed being delivered between a network node and a customer premise (hereinafter "line speed test"). A modem can include any type of modem or customer premises equipment (CPE) used for connecting a device to the internet, including but not limited to a Digital Subscriber Line (DSL) modem and a Cable modem. The description that follows is directed to one or more embodiments, and should not be construed as limiting in nature. In one embodiment, the line speed test is initiated from the modem itself. In another embodiment, a computing device in communication with the modem at the customer's premise may initiate the test. In a third embodiment, the line speed test may be initiated from a network node.

Figure 1:
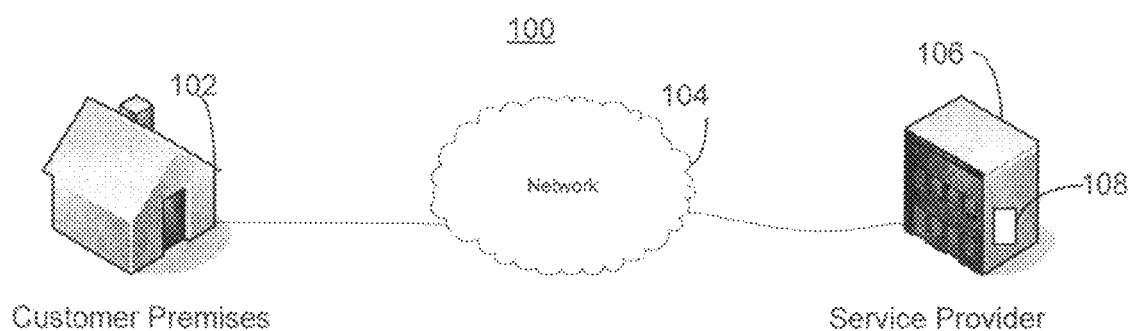
FIG. 1 is an illustration of a typical configuration of network services being delivered to a subscriber by a service provider.

FIG. 1 represents a network for providing network communications on which a line speed test may be performed. Generally, the customer premises 102 is in communication with a network node 106 through a network 104. The customer premises 102 may be a residence, a business, or any other location that an Internet connection exists. The network 104 may be a PSTN, used for connecting a DSL modem to the network node 106, or a cable network, used for connecting a cable modem to the network node 106 that enables communication over the Internet, or any other wide area network for example. It should be understood that any network communications to a customer may be line speed tested. Any other type of connection using a modem is also contemplated by this invention. The network node 106 may be a service provider, a server or group or servers, or any element which is capable of connecting to the network 104. Additionally, the network node 106 to be connected to may be user selected and may be on the service provider network or a different location on the Internet that is capable of performing a line speed test. Regardless of the ability to connect to the Internet, the network node 106 is connected to or in communication with the network 104.

Figure 2:
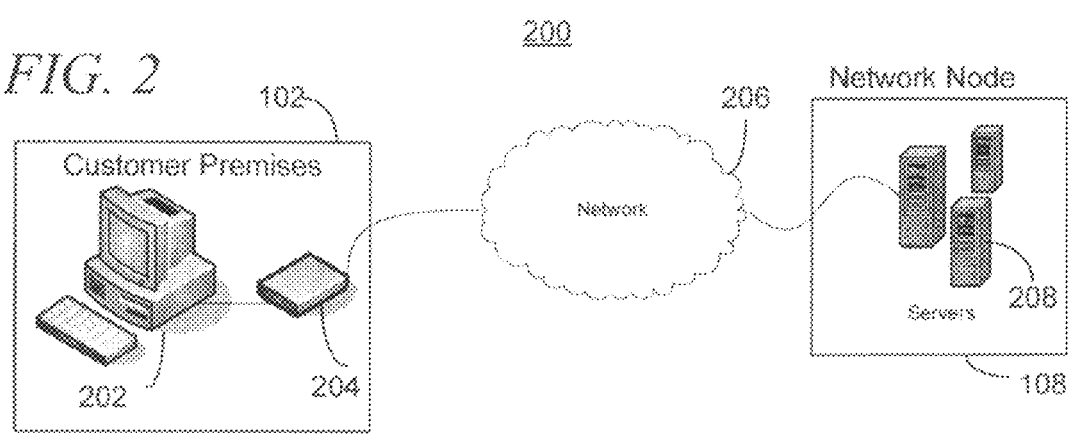
FIG. 2 is a more detailed illustration of components used during implementation of a line speed test.

FIG. 2 is a block diagram of an embodiment of a network configuration in accordance with the principles of the present invention. The customer premises, in this embodiment, includes a computing device 202 in connection with a modem 204. The computing device 202 may be a personal computer, laptop computer or any other device capable of communication with the modem. The modem 204 may be a DSL modem, cable modem, or any type of modem capable of connecting to the network 206. The network 206 may be a PSTN or cable network for use with the modem 204. However, any other type of network capable of communicating with the modem 204 is also contemplated. The network node 210 in this embodiment may include one or more servers 208 that are in communication with the network 206. One or more of the servers 208 may communicate with the modem 204 to perform a line speed test for a subscriber. In this embodiment, the computing device 202 may initiate the line speed test, the modem 204 may initiate the line speed test, or the servers 208 at the network node 210 may initiate the line speed test, as further described below.

Figure 3A:
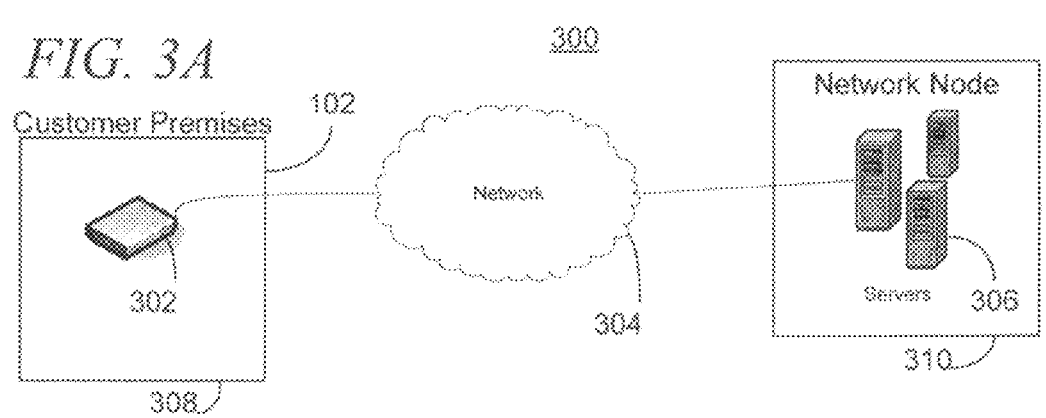
FIG. 3A is an illustration of another embodiment of components used during implementation of a line speed test.

FIG. 3A is an illustration of an exemplary modem 302 attached to network 304 without any computing devices on the customer premises 102 being attached to the modem 302. In this embodiment, the initiation of the line speed test may occur at the modem 302 or from the network node 310, by an operation initiated from a server of a group of servers 306. As in the other figures, the modem 302 is not limited to a DSL or Cable modem, nor is the network node 310 limited to the group of servers 306 depicted.

Figure 3B:
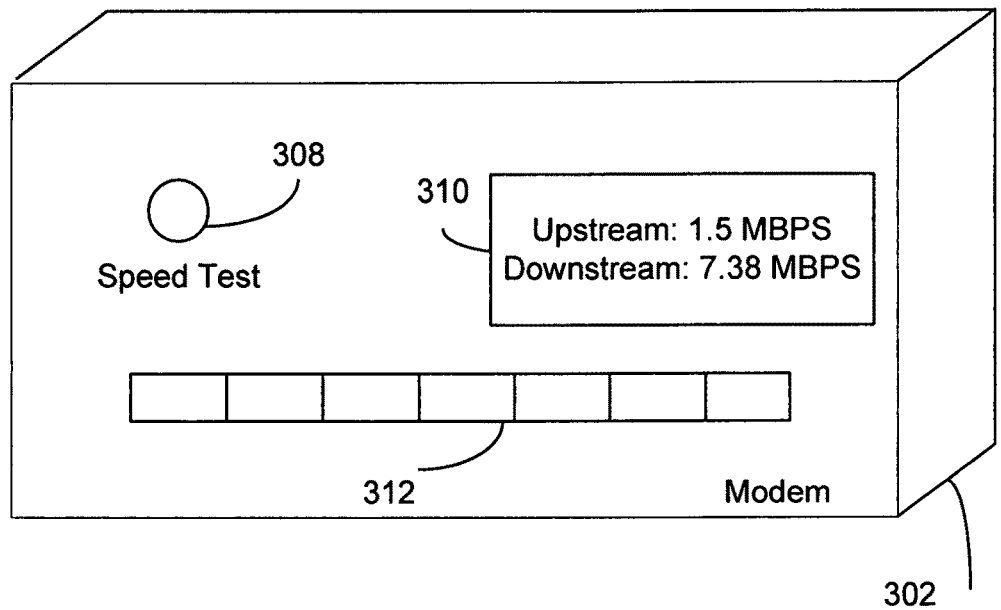
FIG. 3B is an illustration of a modem configured to perform a line speed test.

FIG. 3B is an illustration of an exemplary modem 302 configured to perform a line speed test in accordance with the principles of the present invention. LEDs 312 may be present to indicate activity on the modem as well as to display, among other things, activity status. The modem 302 additionally includes a display element 310, such as an LCD screen or similar display device that may display the upstream and downstream speed after the line speed test has been run. As shown, the upstream and downstream speeds are depicted. However, any other type of information may also be displayed, such as a menu to select what network or Internet address to access for the line speed test. For initiating the line speed test directly from the modem 302, a button 308 that enables a user to activate the line speed test without the need for any other computing device to be attached to or in communication with the modem 302 at the customer premises. Alternatively, the button 308 may be any electro-mechanical device 308, such as a pad, key, switch, push-button or any other element that sends a signal in response to being activated by a user to begin the line speed test using the modem 302. The presence of the speed test button 308 on the modem does not preclude the other methods of initiating the line speed test; rather, modem enabled initiation provides another method for initiating the line speed test independent of other devices performing the initiation.

Figure 4:
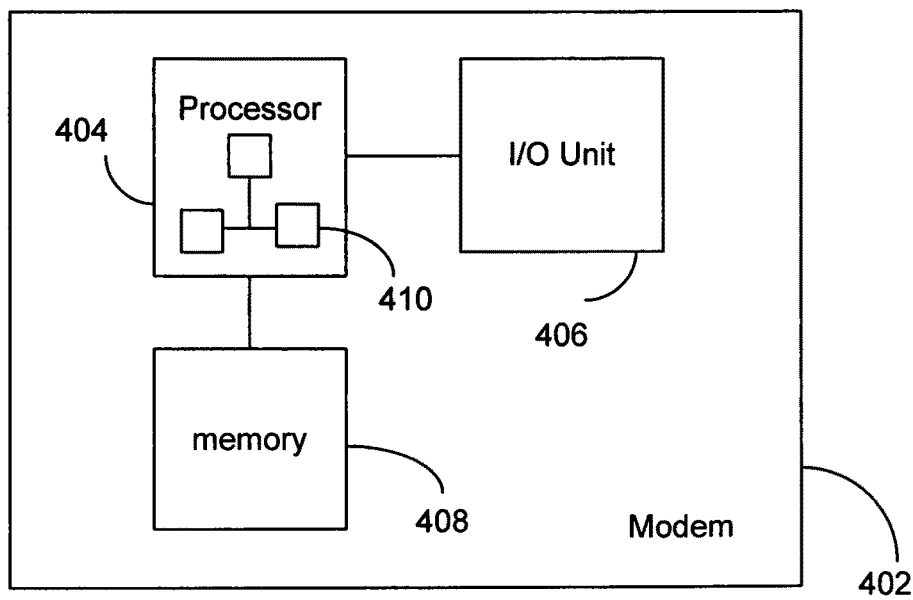
FIG. 4 is a detailed illustration of elements of the modem of FIG. 3B.

FIG. 4 is a block diagram of exemplary internal components of a modem 402 that complies with the principles of the present invention. The modem 402 may include a processor 404 capable of processing software 410 and be in communication with an I/O unit 406 for controlling input and output to the modem 402 and memory 408 for storing data. Because the modem 402 contains at least these components, the modem 402 is capable of performing the line speed test entirely without a computing device being attached to the modem 402 at the customer premises. This independence allows for a more accurate line speed test to be performed by the modem 402 without going through a firewall or any other connection past a line speed test module located in the modem. Further, the independent operation of the modem 402 to initiate the line speed test enables a user or technician to confirm the operation of the modem 402 during installation. Additionally, no longer is a Java® Applet necessary to be run on a computing device in communication with the modem 402 at the customer premises in order to perform the calculations and line speed test. Testing the line speed at the modem 402 rather than at an attached computing device also removes any bottlenecks caused by communication between the modem 402 and the computing device, whether the communication is wireless, Ethernet, or any other method of communication.

The software 410 may be configured to enable the line speed test to be initiated and calculations processed entirely within the modem 402. The I/O unit 406 may include a variety of types of hardware and software that are capable of communicating with a network as well as other attached local devices.

Figure 5:
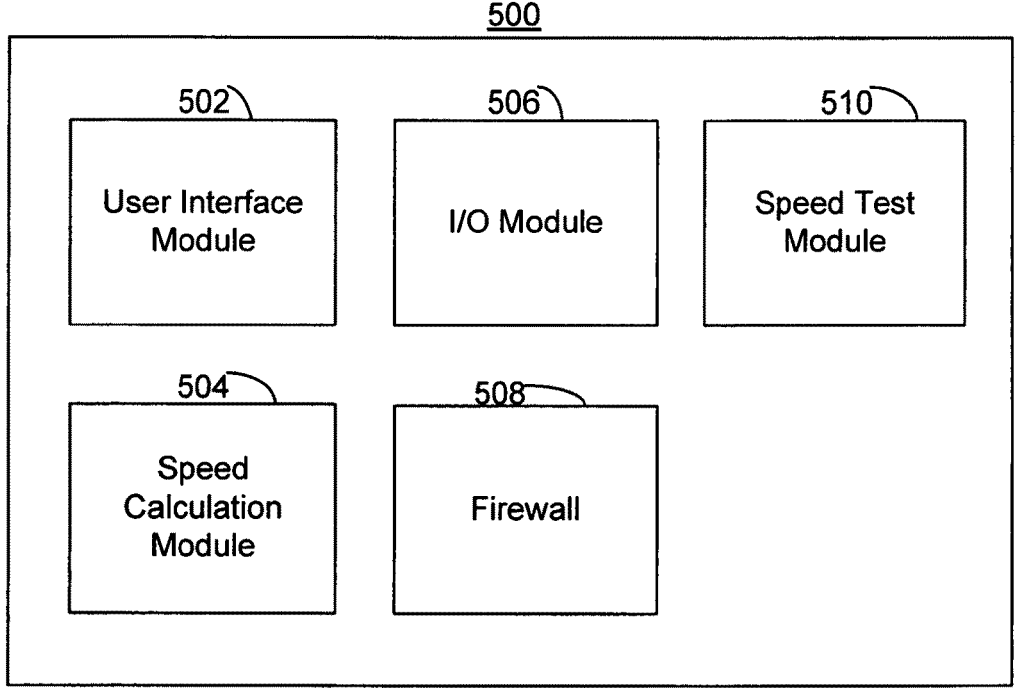
FIG. 5 is an illustration of exemplary software modules executed by a processing unit of the modem of FIG. 3B.

FIG. 5 is an illustration of exemplary software modules 500 that may be part of the software 410 (FIG. 4) for performing functions in accordance with the principles of the present invention. The software modules 500 may include a user interface module 502, speed calculation module 504, input/output module 506, firewall 508 and line speed test module 510. The software modules 500 may include other software modules, fewer software modules, or software modules in combination depending upon the functionality of the modem 402 (FIG. 4).

The user interface module 502 may be configured to enable a user to initiate the line speed test and view the results of the line speed test. The user interface module 502 may operate in conjunction with I/O module 506 that provides communication with any attached computing devices or the network node from which the line speed test is to be run. The user interface module 502 may be configured to direct prompts on the LCD display located on the modem. Alternatively, the user interface module 502 may enable the user to interface with the modem via an online interface, such as through a web browser or Java® applet on the computing device, via the I/O module 506. A configuration screen may be accessed through the web browser to initiate the line speed test and display the results. However, download line speed calculations take place at the modem, before sending to the attached computing device in order to remove the additional elements from the calculation, thereby resulting in a true assessment of the line communication speed from the network node.

The speed calculation module 504 may be configured to work in conjunction with the line speed test module 510, user interface module 502, and the I/O module. After the line speed test module 510 has been initiated, which may send a file to the network node selected or request a file to be sent from the network node, depending on the type of test to be performed, data is communicated to the line speed calculation module 504 for line speed processing to calculate how many bits per second are being received or any other line speed parameter. The line speed processing occurs without going through the firewall 508 or other overhead processing, in order to reduce the potentially negative impact on the line speed. In order to display the line speed test results, the results may be communicated through the I/O module 506 to any number of outputs, including the display located on the modem, through the attached computing device, or back over the network to the initiating server.

The firewall 508, as in the other modules, may be implemented in hardware or software and may be configured to filter (i.e. permit or deny network traffic through the network A typical firewall has the potential to have an adverse affect on the line communication speed. Therefore, according to the principles of the present invention, the parts of the line speed test relevant to the calculating and performing of the test occur on the network side of the firewall 508 in order to diminish any adverse affect on the line speed a shown and described in FIGS. 6A-6C.

Figure 6A:
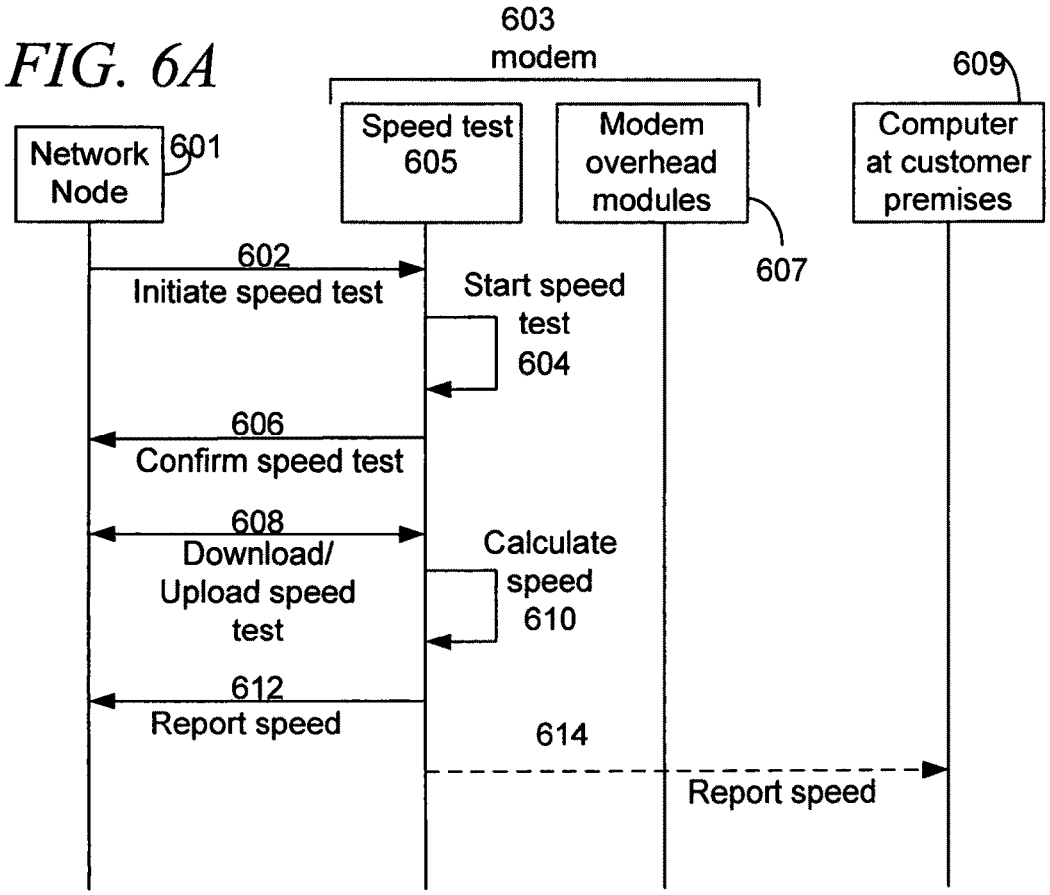
FIG. 6A is a timing diagram of an exemplary process for performing a line speed test that is initiated by a network node.

FIG. 6A is a signal diagram of one exemplary embodiment of the invention. A line speed test is initiated by the network node 601, where an initiate line speed signal is sent at the step 602 to the modem 603, specifically to line speed test module 605, to initiate the line speed test. The line speed test is started at step 604 without going through any of the modem overhead modules 607, such as a firewall. A confirm line speed test signal is then sent back to the network node 601 to confirm the initiation of the line speed test at step 608. A download line speed test, upload line speed test, or both may occur thereafter after step 608. For the download speed test, a file or other data may be requested from the network node and sent to the speed test module 605 operating on the modem 603. For the upload line speed test, a file or other data key sent to the network node 601 from the speed test module 605. The line speed may then be calculated at step 610 by the speed test module 605 located in the modem 603. The result may then be reported at step 612 back to the network node as that was the element that initiated the speed test. Optionally, the line speed may be reported at step 614 to a computer 609 connected to the modem at the customer premises or through the modem overhead modules 607 and displayed on a display on the modem 603. It is to be noted that this is just one method of performing line speed test and any method that may be performed using the line speed test module located on the modem is also contemplated. As previously described, the testing may occur entirely on the network side of the modem overhead modules 607, which includes the firewall. It should be understood that determination of upload line speed may be made at the network node 601 and communicated to the line speed test module 605.

Figure 6B:
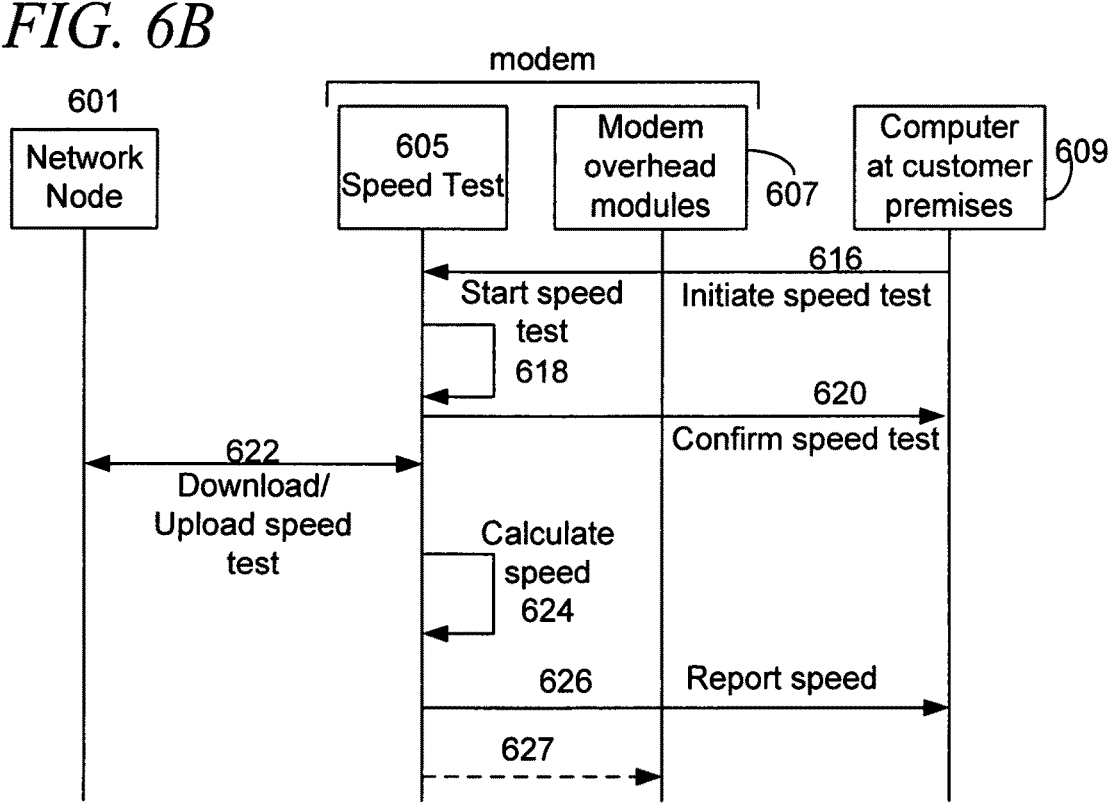
FIG. 6B is a timing diagram of an exemplary process for performing a line speed test that is initiated by a customer premises computer.

FIG. 6B is a block diagram of an alternative embodiment where the line speed test is initiated at a computer located at the customer premises 609. A signal to initiate the line speed test may be sent at step 616 by software running on the computer 609 to the line speed test module 605 being executed on the modem 603. The speed test module 605 begins execution of the line speed test at step 618, and confirms the commencement of the line speed test at step 620 back to the computer located at the customer premises 609. The download/upload speed test is executed at step 622 as described in FIG. 6A, between the network node 601 and the speed test module 605 located on the modem 603 without communication with the modem overhead modules 607. The data that was passed back to the speed test module during the speed test at step 622 is then processed and the speed is calculated at step 624. Only then are the modem overhead modules 607 interacted with and the results reported back 626 to the computer at the customer premises 609. Optionally, the results may be displayed on the modem itself as well, at step 627.

Figure 6C:
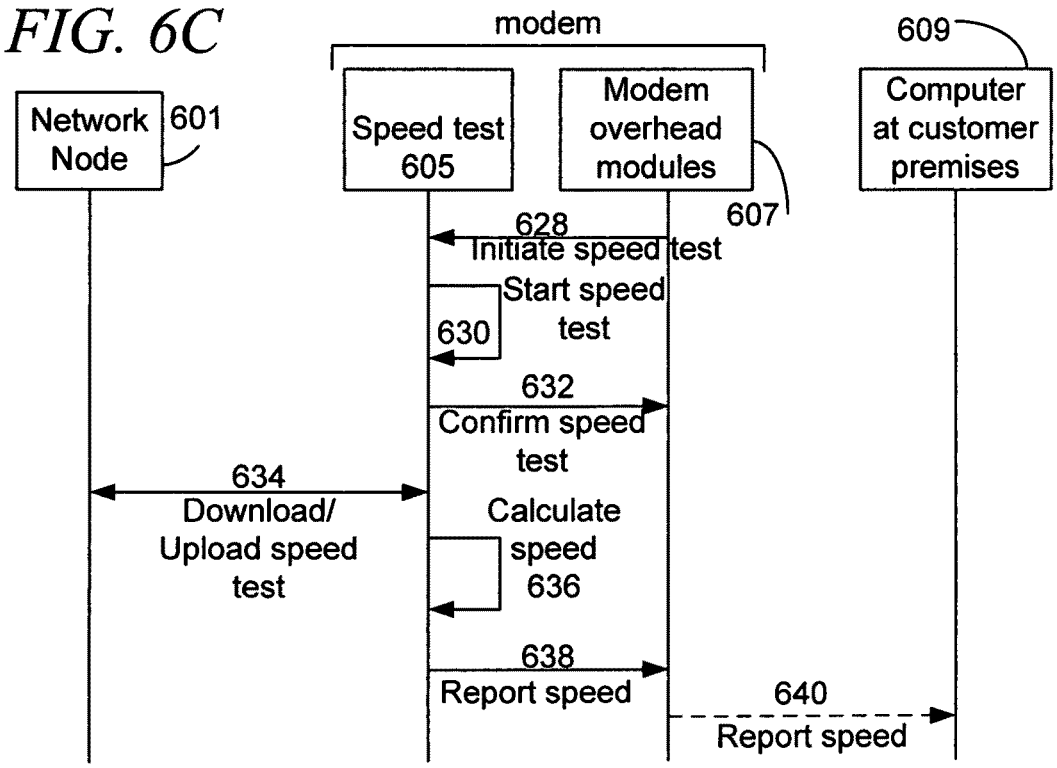
FIG. 6C is a timing diagram of an exemplary process for performing a line speed test initiated at a modem.

The third embodiment, where the speed test is initiated at the modem, is depicted in FIG. 6C. In this embodiment, the speed test may be initiated by a software module 607 in the modem and a communication signal may be sent at step 628 to the speed test module 605 to start the line speed test at step 630. A confirmation is sent that the speed test has begun at step 632, and the download/upload speed test is performed at step 634 between the speed test module 605 and the network node 601. Data collected during the line speed test at step 634 is then calculated at the modem 603 at step 636 and reported back through the modem overhead modules at step 638. Optionally the speed may be reported back to a computer located at the customer premises 609, if one is attached, at step 640.

Figure 7:
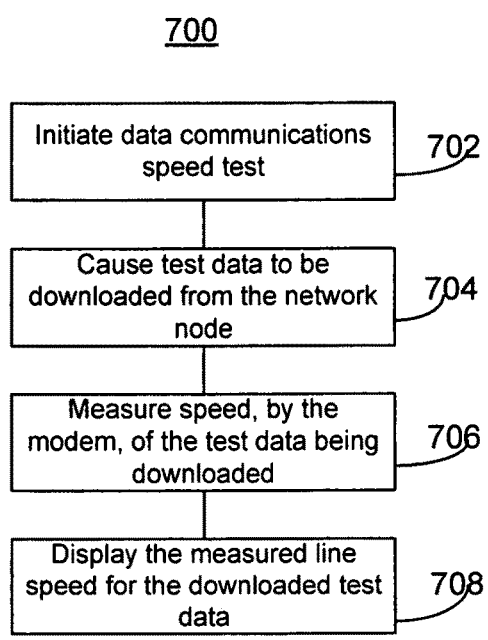
FIG. 7 is a flow chart of an exemplary process for performing a line speed test in accordance with the principles of the present invention.

FIG. 7 is a flow chart of an exemplary process 700 for communicating executing a line speed test from a modem. In one embodiment, the line speed test may be initiated 702 from a network node. In another embodiment, the line speed test may be initiated by a computing device attached to the modem at the customer premises side of the network. In a third embodiment, the line speed test may be initiated directly from the modem. After the initiation of the line speed test for a downstream test, data may be downloaded from the network node to the modem at step 704. Additionally, if an upstream test is to be performed, data may be uploaded from the modem to the network node. The line speed may then be measured by the modem of the test data being downloaded at step 706. The measurement may occur directly at the modem before the firewall for downstream tests. Alternatively, for the upstream test, the measurement may occur at the network node or at the modem with the data being communicated back to the modem in the event the measurement occurs at the network node. The measured line speed for the downloaded test data is displayed at step 708. This may occur on any number of devices capable of displaying the results on either the network node, the modem itself, or on a computing device attached to the modem at the customer premises.

The previous description is of at least one embodiment for implementing the invention, and the scope of the invention should not necessarily be limited by this description. The scope of the present invention is instead defined by the following claims.

What is claimed is:

1. A method for testing data communications speed being delivered between a network node and a customer premise, said method comprising:

initiating a data communications speed test to determine speed of data being communicated between a modem at the customer premise and the network node over a network, the customer premise being a physical location of an end user, and wherein a firewall of the modem separates the customer premise from the network;

causing test data to be downloaded from the network node;

causing upload test data to be uploaded to the network node;

receiving the test data directly on a network facing side of the firewall;

measuring line speed, by the modem, of the directly received test data being downloaded, as received on the network facing side of the firewall;

measuring line speed, by the modem, of the upload test data being uploaded to the network node after the upload test data passes through the firewall of the modem;

passing a result of the data communications speed test through the firewall to a customer premise facing side of the firewall, wherein the result includes the measured line speed;

displaying the measured line speed of the downloaded test data; and displaying the measured line speed of the uploaded test data.

2. The method according to claim 1, wherein initiating is in response to a command generated by activating a button located on the modem.

3. The method according to claim 1, wherein initiating is in response to a command generated by a computing device in communication with the modem.

4. The method according to claim 3, wherein initiating is in response to a command generated by the computing device being operated by a customer of a service provider.

5. The method according to claim 3, wherein initiating is in response to a command generated by the computing device operated by a service provider.

6. The method according to claim 1, wherein initiating is in response to a command generated by activating a button located on the modem.

7. The method according to claim 1, wherein initiating is in response to a command generated by a computing device in communication with the modem.

8. The method according to claim 7 wherein initiating is in response to a command generated by the computing device operated by one of a customer of a service provider and a service provider.

9. A customer premises modem operating at a physical location of an end user, comprising:
 an input/output unit configured to communicate communications signals over a communications network;
 a firewall separating communications facing the communications network from the customer premises;
 a processing unit in communication with said input/output unit, and configured to:
 initiate a data communications speed test, in response to receiving a data communications speed request, between the customer premises modem and a network node, wherein the customer premises modem and the network node are communicatively coupled over the communications network;
 receive, via the input/output unit, test data directly on a communications network facing side of the firewall;
 transmit, via the input/output unit, upload test data to the network node;
 measure communications speed of the directly received test data being downloaded, as received on the communications network facing side of the firewall;
 measure communications speed of the upload test data being uploaded to the network node after the upload test data passes through the firewall of the modem;
 pass a result of the data communications speed test through the firewall to a customer premises facing side of the firewall, wherein the result includes the measured communications speed; and
 report the measured communications speed; display the measured communications speed of the downloaded test data on an electronic display; and display the measured communications speed of the uploaded test data on the electronic display.

10. The system according to claim 9, further comprising an electronic display, said processing unit further configured to display the measured speed of the downloaded test data on said electronic display.

11. The system according to claim 9, further comprising an electromechanical element in communication with said processing unit and configured to be engaged by a user at a customer premise to generate the data communications speed request.

12. The system according to claim 9, wherein the data communications speed request is generated by a computing device communication and received by said processing unit.

13. The system according to claim 12, wherein said input/output unit is further configured to communicate with a computing device operated by a customer of a service provider, and wherein said processing unit receives the data communications speed request from the computing device.

14. The system according to claim 12, wherein the computing device is operated by a service provider and test data is communicated via the communications network from the computing device.

15. The system according to claim 12, wherein said computing unit is configured to communicate the measured communication speed to the computing device for display thereon.

* * * * *